(12) United States Patent
Ikegami

(10) Patent No.: US 9,547,569 B2
(45) Date of Patent: Jan. 17, 2017

(54) ELECTRONIC CONTROL UNIT FOR VEHICLE

(75) Inventor: Yusuke Ikegami, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 225 days.

(21) Appl. No.: 13/496,605

(22) PCT Filed: Sep. 14, 2010

(86) PCT No.: PCT/JP2010/065822
§ 371 (c)(1),
(2), (4) Date: Mar. 16, 2012

(87) PCT Pub. No.: WO2011/034052
PCT Pub. Date: Mar. 24, 2011

(65) Prior Publication Data
US 2012/0173071 A1    Jul. 5, 2012

(30) Foreign Application Priority Data
Sep. 17, 2009    (JP) .................................. 2009-215249

(51) Int. Cl.
*G06F 11/22*    (2006.01)
*G06F 11/07*    (2006.01)

(52) U.S. Cl.
CPC ......... *G06F 11/2236* (2013.01); *G06F 11/079* (2013.01); *G06F 11/0739* (2013.01)

(58) Field of Classification Search
CPC ......... G07C 5/00; G07C 5/08; G06F 11/2236; G06F 11/0739
USPC .............................................. 701/29.1, 29.2
See application file for complete search history.

(56) References Cited

U.S. PATENT DOCUMENTS

| | | | |
|---|---|---|---|
| 5,299,420 A | * | 4/1994 | Devier et al. .................... 60/403 |
| 6,275,368 B1 | * | 8/2001 | Yamada et al. ............... 361/140 |
| 7,305,587 B2 | | 12/2007 | Kabune et al. |
| 2003/0028303 A1 | * | 2/2003 | Sebastian et al. .............. 701/41 |
| 2005/0016787 A1 | * | 1/2005 | Lesesky .................. G07C 5/008 180/311 |

(Continued)

FOREIGN PATENT DOCUMENTS

| | | |
|---|---|---|
| JP | 2004-259137 A | 9/2004 |
| JP | 2005-147070 A | 6/2005 |

(Continued)

OTHER PUBLICATIONS

Oliver, D. John, Implementing the J1850 Protocol, Mar. 2007.*
International Search Report of PCT/JP2010/065822, dated Dec. 14, 2010.

*Primary Examiner* — Basil T Jos
(74) *Attorney, Agent, or Firm* — Westerman, Hattori, Daniels & Adrian, LLP

(57) ABSTRACT

To provide a vehicle electronic control unit including a first microcomputer (2, 3) and a second microcomputer (3, 2) capable of transmitting and receiving signals to and from the first microcomputer. One of the first microcomputer and the second microcomputer outputs a PWM signal to the other microcomputer (3, 2). The other microcomputer detects an on-time of the PWM signal, performs a self diagnosis according to the detected on-time, and outputs a self diagnosis result to the one microcomputer. The one microcomputer diagnoses the other microcomputer based on the self diagnosis result.

6 Claims, 5 Drawing Sheets

(56) References Cited

U.S. PATENT DOCUMENTS

2008/0033609 A1* 2/2008 Razavi ................. G01M 17/00
                                                          701/31.4
2010/0281854 A1* 11/2010 Huang et al. .................. 60/276

FOREIGN PATENT DOCUMENTS

JP          2007028411 A  *  2/2007
JP          2009-033909 A     2/2009

* cited by examiner

ELECTRONIC CONTROL UNIT FOR VEHICLE

TECHNICAL FIELD

The present invention relates to an electronic control unit for a vehicle and more particularly relates to a vehicle electronic control unit that diagnoses a microcomputer.

BACKGROUND ART

In recent years, in ECUs (Electronic Control Units) for a vehicle, the importance of a microcomputer (hereinafter, "micom" where appropriate) included therein has been increasing along with the enhancement of electronic control in vehicles.

For example, in a vehicle electronic control unit, a target command value is obtained in a micom and various devices related to an engine or the like are driven based on the obtained target command value. Accordingly, monitoring of operations of a micom has been proposed to ensure operations of these devices.

In Patent Document 1, a question signal 20 is transmitted from a monitoring circuit 2 to a micom 1, the micom 1 performs a self-function check calculation according to the content of the question signal 20 and transmits its calculation result back to the monitoring circuit 2 as a response signal 10. The monitoring circuit 2 then compares the content of the response signal 10 transmitted from the micom 1 to a correct answer so as to monitor whether the micom is operating normally. The question signal 20 and the response signal 10 are transmitted and received by serial communications.

PRIOR ART DOCUMENT

Patent Document

Patent Document 1: Japanese Patent Application Laid-open No. 2004-259137

SUMMARY OF THE INVENTION

Problem to be Solved by the Invention

However, according to studies of the present inventor, a sub-microcomputer (hereinafter, "sub-micom" where appropriate) in a monitoring system is not used merely to monitor operations of a main microcomputer (hereinafter, "main micom" where appropriate). When the main micom performs a complicated calculating process on data required for controlling various devices, the sub-micom supports the calculating process of the main micom.

Accordingly, when the question signal 20 and the response signal 10 are transmitted by serial communications as in the configuration of Patent Document 1, data communications between the main micom and the sub-micom related to the complicated calculating process is prioritized to data communications for monitoring operations of the main micom, and thus it is conceivable that the main micom is not diagnosed quickly.

The present invention has been achieved in view of the above problems, and an object of the invention is to provide a vehicle electronic control unit that can diagnose a microcomputer quickly and reliably.

Means for Solving the Problem

To achieve the above object, a first aspect of the present invention is to provide a vehicle electronic control unit including a first microcomputer and a second microcomputer capable of transmitting and receiving a signal to and from the first microcomputer, wherein one of the first microcomputer and the second microcomputer outputs a voltage signal that indicates a voltage at a high level or a low level to the other microcomputer, the other microcomputer detects a high-time during which the voltage of the voltage signal is at the high level, performs a self diagnosis according to the detected high-time, and outputs a result of the self diagnosis to the one microcomputer, and the one microcomputer diagnoses the other microcomputer based on a result of the self diagnosis.

According to a second aspect of the present invention, in addition to the first aspect, the other microcomputer diagnoses the one microcomputer based on at least one of the high-time and a period of the PWM signal input from the one microcomputer.

According to a third aspect of the present invention, in addition to the second aspect, the other microcomputer diagnoses the one microcomputer based on at least one of the high-time and a period of the PWM signal input from the one microcomputer.

According to a fourth aspect of the present invention, in addition to any one of the first to third aspects, the other microcomputer outputs a result of the self diagnosis to the one microcomputer as a PWM signal, and the one microcomputer diagnoses the other microcomputer based on at least one of a high-time and a period of a PWM signal.

According to a fifth aspect of the present invention, in addition to the first or second aspect, the other microcomputer outputs a result of the self diagnosis to the one microcomputer also through serial communications.

According to a sixth aspect of the present invention, in addition to any one of the first to fifth aspects, the other microcomputer further diagnoses the one microcomputer and prohibits an operation of a target to be controlled by the vehicle electronic control unit when one of a diagnosis of the other microcomputer by the one microcomputer and a diagnosis of the one microcomputer by the other microcomputer is negative.

Effect of the Invention

According to the vehicle electronic control unit of the present invention, a microcomputer is mainly diagnosed by a PWM signal instead of serial communications, and thus the microcomputer can be diagnosed rapidly and reliably.

EMBODIMENT FOR CARRYING OUT THE INVENTION

A vehicle electronic control unit according to an embodiment of the present invention will be explained below in detail with reference to the accompanying drawings.

Figure 1:
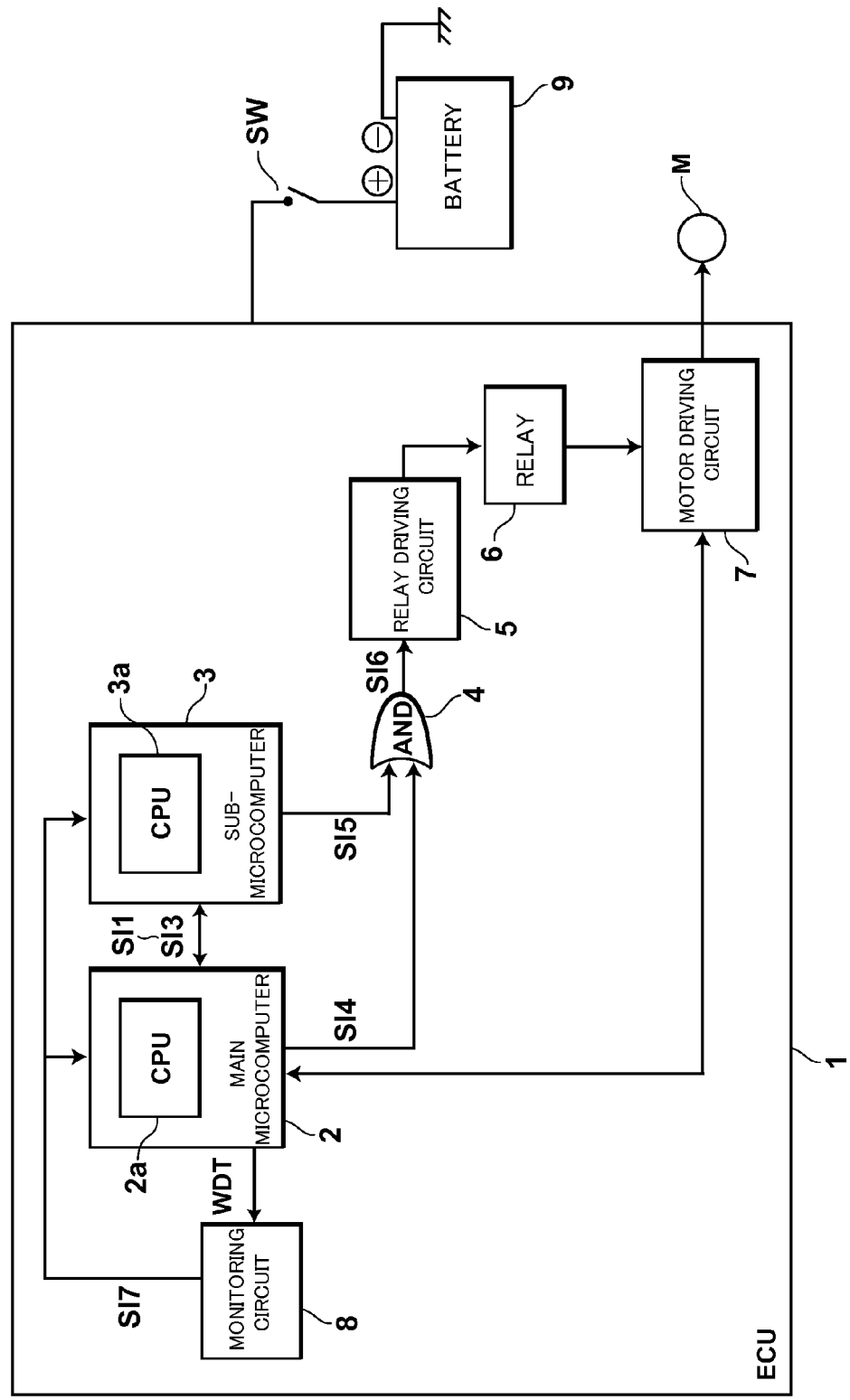
FIG. 1 is a block diagram of a configuration of a vehicle electronic control unit according to an embodiment of the present invention.

FIG. 1 is a block diagram of a configuration of the vehicle electronic control unit according to the present embodiment.

As shown in FIG. 1, a vehicle ECU (Electronic Control Unit) 1 according to the present embodiment controls operations of an electronic throttle motor M and includes a main micom 2, a sub-micom 3, an AND circuit 4, a relay driving circuit 5, a relay 6, a motor driving circuit 7, and a monitoring circuit 8. Electric power required for operations of the electronic throttle motor M is supplied from a battery 9 via an ignition switch SW to the electronic control unit 1. Needless to mention that a target to be controlled by the electronic control unit 1 is not limited to the electronic throttle motor M, and other loads operable in a vehicle are also included.

The main micom 2 is a microcomputer including a CPU (Central Processing Unit) 2a. The CPU 2a operates according to a control program stored in a memory (not shown) of the main micom 2 so as to be able to control operations of the entire electronic control unit 1 and to diagnose operations of the sub-micom 3.

The sub-micom 3 is a microcomputer including a CPU 3a. The CPU 3a operates according to a control program stored in a memory (not shown) of the sub-micom 3 so as to be able to support a process of the main micom 2 according to a control signal from the main micom 2 and to diagnose operations of the main micom 2. The main micom 2 and the sub-micom 3 are also able to transmit and receive signals SI1, SI2, and SI3 to be explained later.

Two input terminals of the AND circuit 4 are connected to outputs of the main micom 2 and the sub-micom 3, respectively, and its output terminal is connected to the relay driving circuit 5. When both a relay-drive control signal SI4 output from the main micom 2 and a relay-drive control signal SI5 output from the sub-micom 3 are at a high level, the AND circuit 4 outputs a relay drive signal SI6 at a high level to the relay driving circuit 5. Meanwhile, when at least one of the relay-drive control signal SI4 output from the main micom 2 and the relay-drive control signal SI5 output from the sub-micom 3 is at a low level, the AND circuit 4 outputs the relay drive signal SI6 at a low level to the relay driving circuit 5.

When the level of the relay drive signal SI6 output from the AND circuit 4 is switched from a low level to a high level, the relay driving circuit 5 switches the relay 6 from an off state to an on state to supply electric power of the battery 9 to the motor driving circuit 7. Meanwhile, the level of the relay drive signal SI6 output from the AND circuit 4 is switched from a high level to a low level, the relay driving circuit 5 switches the relay 6 from an on state to an off state to stop the supply of electric power from the battery 9 to the motor driving circuit 7.

The motor driving circuit 7 uses electric power of the battery 9 to control driving of the electronic throttle motor M according to the control signal from the main micom 2 when the relay 6 is in an on state.

The monitoring circuit 8 uses a pulse signal WDT output in association with an operation of the main micom 2 to monitor whether the main micom 2 operates for performing a time measuring operation. When the pulse signal WDT is stopped or delayed, the monitoring circuit 8 transmits a reset signal SI7 to the main micom 2 and the sub-micom 3 to reset the main micom 2 and the sub-micom 3.

Next, a monitoring process of the vehicle electronic control unit 1 with the above configuration is explained in detail also with reference to FIGS. 2 to 5. The monitoring process of the electronic control unit 1 is a mutual monitoring process performed by the CPU 2a of the main micom 2 and the CPU 3a of the sub-micom 3 in a cooperative manner. In the following explanations, such a process is explained by exemplifying a case where the sub-micom 3 monitors and diagnoses the main micom 2 and the main micom 2 self-diagnoses and diagnoses the sub-micom accordingly.

In the present embodiment, explanations are made by applying, as a representative, a PWM (Pulse Width Modulation) signal to a voltage signal used in a mutual monitoring process. The PWM signal has a low level voltage and a high level voltage switched from the low level voltage so as to have a predetermined on-time. A predetermined high-time during which a high level voltage is maintained corresponds to an output width of the PWM signal, and a period that a high level voltage appears corresponds to an output period of the PWM signal. Needless to mention, a normal voltage signal having a high level voltage and a low level voltage can be applied to the voltage signal. In a case of such a normal voltage signal, the predetermined high-time during which a high level voltage is maintained is the output width of the voltage signal, and the period that a high level voltage appears is the output period of the voltage signal.

Figure 2:
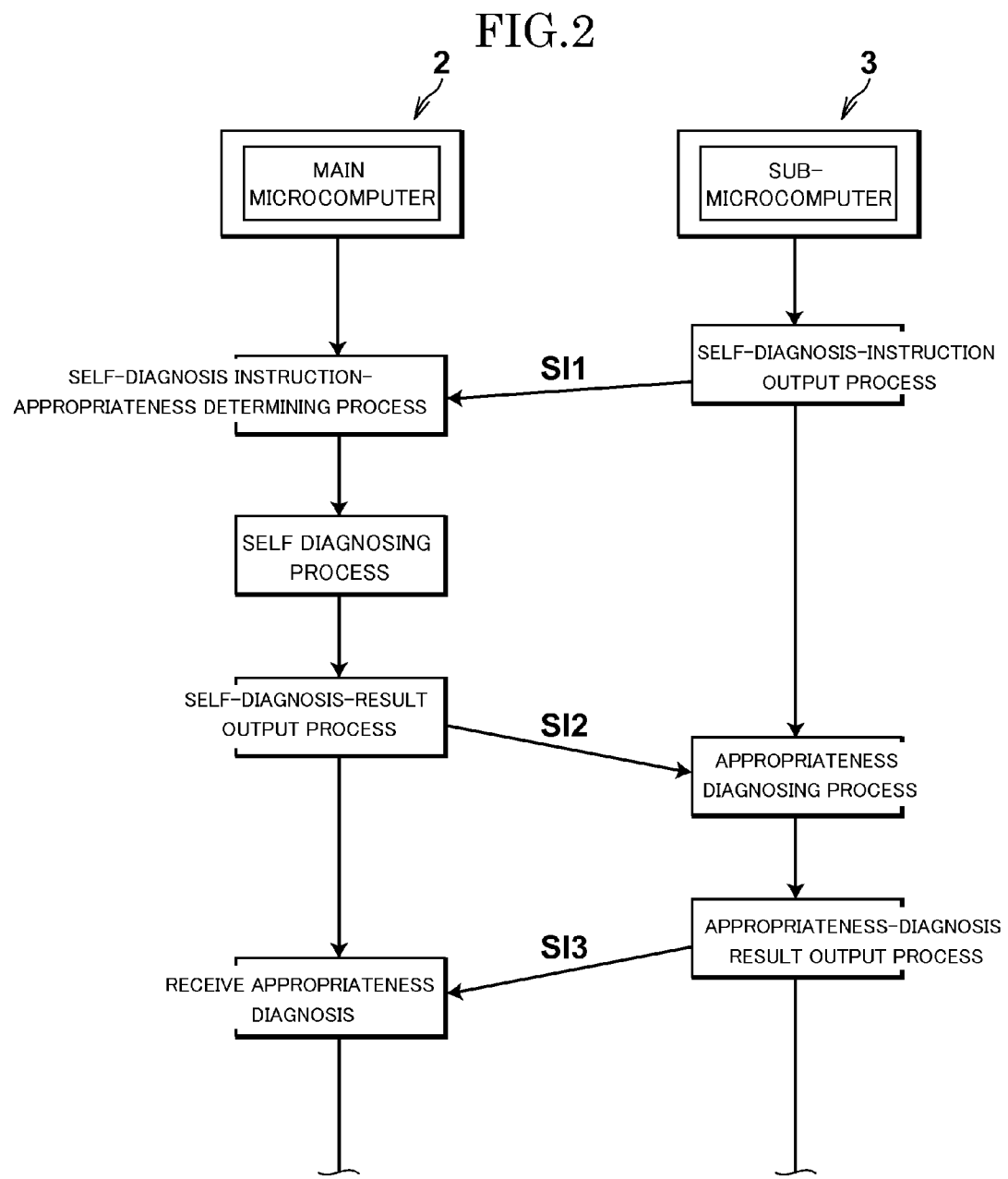
FIG. 2 is a sequence chart showing an operation sequence of a mutual monitoring process performed between a main micom and a sub-micom in the vehicle electronic control unit according to the embodiment.

An overall flow of the mutual monitoring process between the main micom 2 and the sub-micom 3 is explained first also with reference to FIG. 2.

FIG. 2 is a sequence chart showing an operation sequence of a mutual monitoring process performed between a main micom and a sub-micom in the vehicle electronic control unit according to the present embodiment.

As shown in FIG. 2, first, the sub-micom 3 outputs the PWM signal SI1 that indicates a self-diagnosis instruction to the main micom 2 to the main micom 2 as a self-diagnosis instruction signal (a self-diagnosis-instruction output process).

The main micom 2 then diagnoses whether the output width and the output period of the PWM signal SI1 input from the sub-micom 3 are appropriate. When the main micom 2 determines that the output width and the output period of the PWM signal SI1 are not appropriate, it determines (diagnoses) that the sub-micom 3 is abnormal (a self-diagnosis instruction-appropriateness determining process). As explained above, when the main micom 2 determines that the sub-micom 3 is abnormal, the relay-drive control signal SI4 to the AND circuit 4 is switched to a low level, so that the relay 6 is switched off. Meanwhile, when the main micom 2 determines that the output width and the output period of the PWM signal SI1 input from the sub-micom 3 are appropriate, the PWM signal SI1 is appropriately usable as a self-diagnosis instruction from the sub-micom 3. The main micom 2 thus makes a self diagnosis (a self-check) corresponding to the output width of the PWM signal SI1 (a self diagnosing process).

The main micom 2 then outputs, based on a self diagnosis result of the self diagnosing process, the PWM signal SI2 that indicates the self diagnosis result to the sub-micom 3 as a self-diagnosis result signal (a self-diagnosis-result output process).

Next, the sub-micom 3 monitors the PWM signal SI2 output from the main micom 2 and diagnoses whether the self diagnosis result of the main micom 2 indicated by the input PWM signal SI2 is appropriate (an appropriateness diagnosing process). The sub-micom 3 then outputs a result related to whether the self diagnosis result of the main micom 2 is appropriate to the main micom 2 as an appropriateness-diagnosis result signal SI3 (an appropriateness-diagnosis-result output process). By these steps, a series of mutual monitoring is performed. Thereafter, the series of mutual monitoring processes is repeated at a predetermined period. When the sub-micom 3 determines that the self diagnosis result of the main micom 2 is not appropriate, the sub-micom 3 determines that the main micom 2 is abnormal and switches the relay-drive control signal SI5 to the AND circuit 4 to a low level to switch the relay 6 off.

In the mutual monitoring process described above, the self diagnosing process of the main micom 2 is not limited to one specific type of the self diagnosing process, and plural types of self diagnosing processes can be performed. In this case, the sub-micom 3 can give plural types of self diagnosis instructions sequentially or randomly. Furthermore, as these plural types of self diagnosis instructions, the sub-micom 3 can set PWM signals with different output widths corresponding to plural types of self diagnosis instructions in advance. In this case, the main micom 2 is bale to output self diagnosis results corresponding to the respective types of self diagnosis instructions to the sub-micom 3.

In the mutual monitoring process described above, the main micom 2 can determine whether at least one of the output width and the output period of the PWM signal input from the sub-micom 3 serving as a self-diagnosis instruction signal is appropriate. Furthermore, the main micom 2 can make a self diagnosis corresponding to at least one of the output width and the output period of the PWM signal input from the sub-micom 3 serving as a self-diagnosis instruction signal. The sub-micom 3 can determine whether at least one of the output width and the output period of the PWM signal input from the main micom 2 serving as a self-diagnosis result signal is appropriate.

In the mutual monitoring process described above, when there is enough processing capability for the main micom 2 or the sub-micom 3, the process of the main micom 2 can be replaced by the process of the sub-micom 3 so that the main micom 2 performs the self-diagnosis-instruction output process, the appropriateness diagnosing process, and the appropriateness-diagnosis-result output process for the sub-micom 3 and the sub-micom 3 performs the self-diagnosis instruction-appropriateness determining process, the self diagnosing process, and the self-diagnosis-result output process.

Next, the mutual monitoring process described above between the main micom 2 and the sub-micom 3 shown in FIG. 2 is explained in detail by exemplifying a case where one type of self diagnosing process is used and the output width and the output period of a one-pulse PWM signal are appropriately used.

Figure 3:
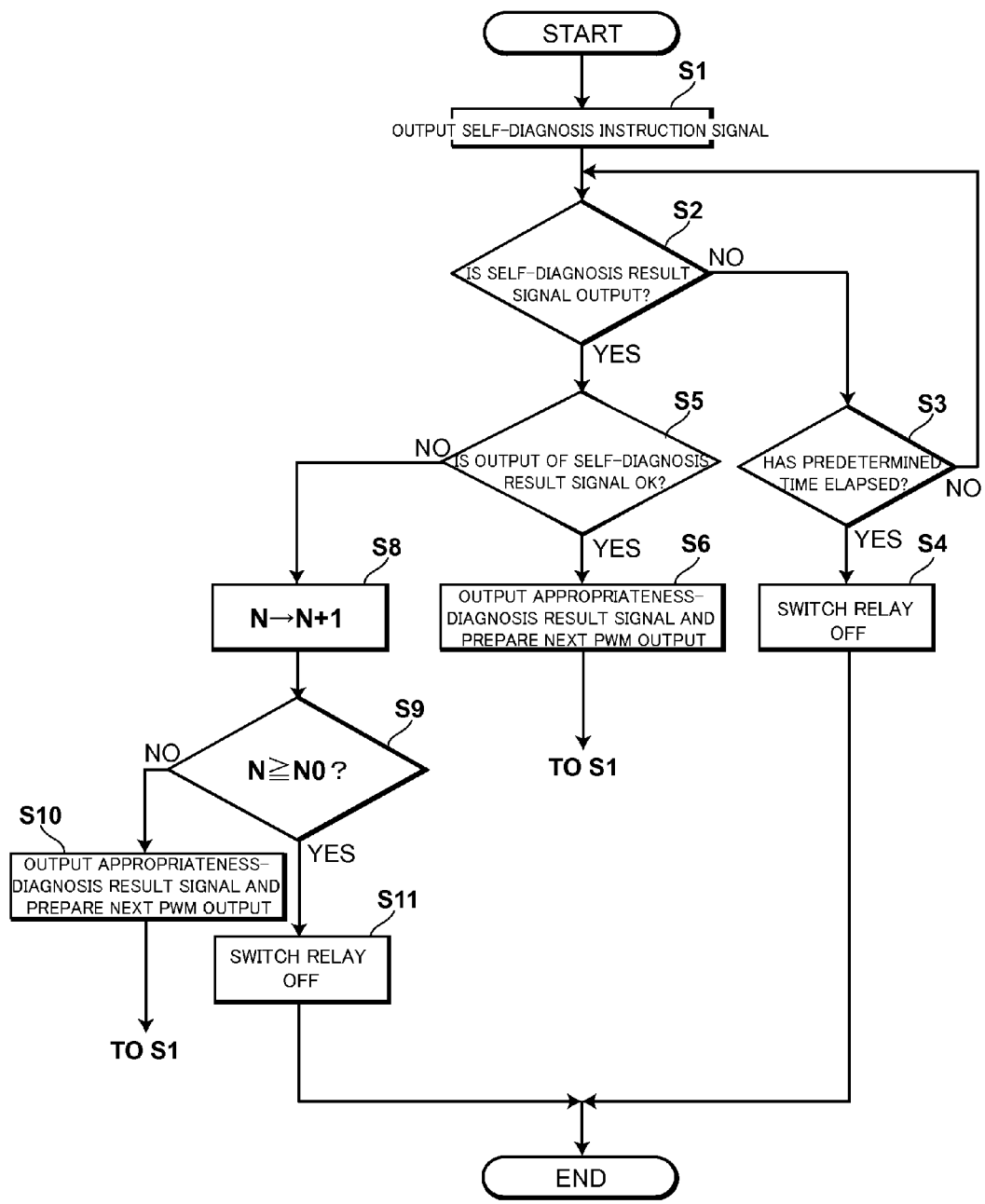
FIG. 3 is a flowchart showing a processing flow when a sub-micom of the vehicle electronic control unit according to the embodiment monitors and diagnoses operations of a main micom.
Figure 4:
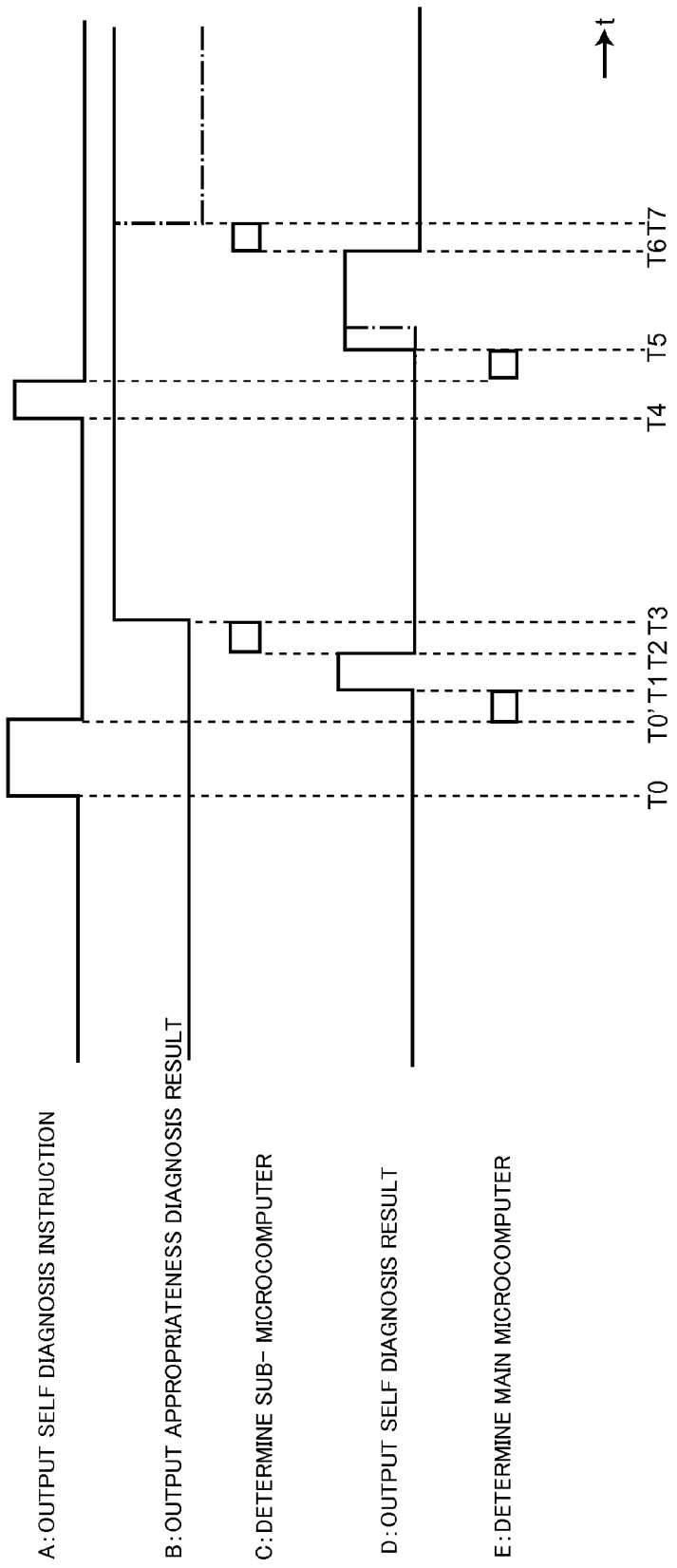
FIG. 4 is a timing chart mainly corresponding to processes shown in FIG. 3.

A process in a case where the sub-micom 3 monitors and diagnoses the main micom 2 is explained first also with reference to FIGS. 3 and 4.

FIG. 3 is a flowchart showing a processing flow when a sub-micom of the vehicle electronic control unit according to the present embodiment monitors and diagnoses operations of a main micom. FIG. 4 is a timing chart mainly corresponding to processes shown in FIG. 3. With reference to FIG. 4, the horizontal axis represents a time t and the vertical axis represents a voltage for respective outputs (signals), and respective determining steps are schematically shown as a rectangular block.

As shown in FIG. 3, when the process in which the sub-micom 3 monitors and diagnoses the main micom 2 is started according to the ignition switch SW being switched from an off state to an on state, at Step S1, the CPU 3a of the sub-micom 3 outputs the PWM signal SI1 serving as a self-diagnosis instruction signal to the CPU 2a of the main micom 2. As shown in A of FIG. 4, at a time T0, the self-diagnosis instruction signal SI1 is switched from a low level to a high level and is output as a PWM signal having a predetermined pulse width serving as an output width that represents a duration of a high-time. The CPU 3a then proceeds the process to Step S2 that follows Step S1.

At Step S2, the CPU 3a of the sub-micom 3 determines whether the PWM signal SI2 serving as a self-diagnosis result signal that indicates a self diagnosis result obtained by a calculation of the main micom 2 based on the output width of the self-diagnosis instruction signal SI1 is input from the main micom 2. The PWM signal is output at a time T1 shown in D of FIG. 4 and a step of determining whether this PWM signal is input is started at a time T2 shown in C of FIG. 4. When it is determined that the PWM signal SI2 itself is not output, the CPU 3a proceeds the process to Step S3. Meanwhile, it is determined the PWM signal SI2 is output, the CPU 3a proceeds the process to Step S5. In C of FIG. 4, the respective steps subsequent to Step S3 and the respective steps subsequent to Step S5 are performed subsequently to the determining step of Step S2 and typically, shown schematically by a rectangular block started at the time T2 and ends at a time T3 in C of FIG. 4.

In the process of Step S3, when it is determined that the PWM signal SI2 itself serving as a self-diagnosis result signal is not output, the CPU 3a of the sub-micom 3 determines whether a predetermined time (for example, a time point of the time T2 shown in FIG. 4) has elapsed since the self-diagnosis instruction signal SI1 is output to the main micom 2. As a result of determination, when the predetermined time has not elapsed, the CPU 3a returns the process to Step S2. Meanwhile, as a result of determination, when the predetermined time has elapsed, the CPU 3a proceeds the process to Step S4 that follows Step S3.

At Step S4, the CPU 3a of the sub-micom 3 determines that there is an event, such as a wire connecting the main micom 2 to the sub-micom 3 is broken, and then outputs the relay-drive control signal SI5 at a low level to the AND circuit 4. The AND circuit 4 outputs the relay drive signal SI6 at a low level to the relay driving circuit 5 accordingly. The relay driving circuit 5 to which the low-level relay drive signal SI6 is input switches the relay 6 to an off state, so that the supply of electric power from the battery 9 to the motor driving circuit 7 is stopped and driving of the electronic throttle motor M is prohibited. The process of Step S4 is thus completed and this series of processes ends.

At Step S5, when it is determined that the PWM signal SI2 itself serving as a self-diagnosis result signal is output, the CPU 3a of the sub-micom 3 determines whether the output width and the output period of the self-diagnosis result signal SI2 output from the main micom 2 coincide with an output width and an output period set in advance. Specifically, the sub-micom 3 stores the output width of the self-diagnosis instruction signal SI1 output to the main micom 2 in its memory, and the CPU 3a calculates, based on this output width of the self-diagnosis instruction signal SI1, the output width and the output period of the self-diagnosis result signal SI2 to be output from the main micom 2. The CPU 3a then determines whether the output width and the output period of the self-diagnosis result signal SI2 output by the main micom 2 because the self diagnosis result is appropriate actually coincide with the output width and the output period of a self-diagnosis result signal that should be originally output from the main micom 2, so that whether the self diagnosis result output from the main micom 2 is appropriate is determined. As a result of determination, when it is determined that the self diagnosis result output from the main micom 2 is not appropriate, the CPU 3a proceeds the process to Step S8. Meanwhile, when the self diagnosis result output from the main micom 2 is appropriate, the CPU 3a proceeds the process to Step S6.

At Step S6, when it is determined that the self diagnosis result output from the main micom 2 is appropriate, the CPU 3a of the sub-micom 3 affirmatively determines that the any failure is not generated in the main micom 2, outputs the appropriateness-diagnosis result signal SI3 that indicates that any failure is not generated to the main micom 2, and prepares the PWM signal SI1 to be output to the main micom 2 as the self-diagnosis instruction signal in the next process. The CPU 3a switches the appropriateness-diagnosis result signal SI3 from a low level to a high level at a time T3 as shown in B of FIG. 4. The CPU 3a returns the process to Step S1. As shown in A of FIG. 4, the CPU 3a switches the self-diagnosis instruction signal from a low level to a high level at a time T4 and outputs the resultant signal as the PWM signal SI1 having a predetermined width. The CPU 3a then determines whether the PWM signal SI2 serving as a self-diagnosis result signal of the main micom 2 is output at a time T5 as shown in D of FIG. 4, and also whether the PWM signal SI2 is input to the CPU 3a within a predetermined time (for example, a time point of a time T6 shown in FIG. 4) in a determining step schematically shown as a rectangular block started from the time T6 shown in C of FIG. 4.

In the process of Step S8, when it is determined that the self diagnosis result output from the main micom 2 is not appropriate, the CPU 3a of the sub-micom 3 negatively determines that a failure is generated in the main micom 2 in the current process and increments a counted value N of a program counter that counts the number that the process of Step S8 is performed, that is, the number of determinations that a failure is generated in the main micom 2 by one. The process of Step S8 is thus completed and the CPU 3a proceeds the process to Step S9 that follows Step S8. The program counter is incorporated in the CPU 3a.

In the process of Step S9, the CPU 3a of the sub-micom 3 determines whether the number N of determinations that a failure is generated in the main micom 2 is equal to larger than a predetermined value N0 by determining whether the counted value N of the program counter is equal to or larger than the predetermined value N0. As a result of determination, when the number N of determinations that a failure is generated in the main micom 2 is less than the predetermined value N0, the CPU 3a proceeds the process to Step S10. Meanwhile, when the number N of determinations that a failure is generated in the main micom 2 is equal to larger than the predetermined value N0, the CPU 3a proceeds the process to Step S11.

At Step S10 when the number N of determinations that a failure is generated in the main micom 2 is less than the predetermined value N0, the CPU 3a of the sub-micom 3 outputs the appropriateness-diagnosis result signal SI3 that indicates that a failure is generated in the main micom 2 to the main micom 2 and prepares the PWM signal SI1 to be output to the main micom 2 as the self-diagnosis instruction signal in the next process. For example, if a case where the output width and the output period of the PWM signal SI2 serving as a self-diagnosis result signal from the CPU 2a to the CPU 3a at the time T5 in D of FIG. 4 are incorrect and the counted value of the counter is less than the predetermined value N0 is shown by a chain line, the CPU 3a switches the appropriateness-diagnosis result signal from a high level to a low level at a time T7 as shown in B FIG. 4. The CPU 3a then returns the process to Step S1.

At Step S11 when the number N of determinations that a failure is generated in the main micom 2 is equal to or larger than the predetermined value N0, the CPU 3a of the sub-micom 3 makes a failure confirming determination that a failure is generated in the main micom 2 and outputs the relay-drive control signal SI5 at a low level to the AND circuit 4. The AND circuit 4 then outputs the low-level relay drive signal SI6 to the relay driving circuit 5 accordingly. The relay driving circuit 5 to which the low-level relay drive signal SI6 is input switches the relay 6 to an off state, so that the supply of electric power from the battery 9 to the motor driving circuit 7 is stopped and driving of the electronic throttle motor M is prohibited. The process of Step S11 is thus completed and this series of processes ends.

If there is enough room for processing and communications in the main micom 2 when control of the electronic throttle motor M is not performed and when the above process required by the sub-micom 3 is not performed, the CPU 2a of the main micom 2 can perform a predetermined calculation corresponding to a PWM signal input from the CPU 3a of the sub-micom 3 as a self-diagnosis instruction output or a signal of serial communications to perform a self-check, and can command-output its self diagnosis result to the CPU 3a of the sub-micom 3 by serial communications along with its content such as specific numerical values.

Figure 5:
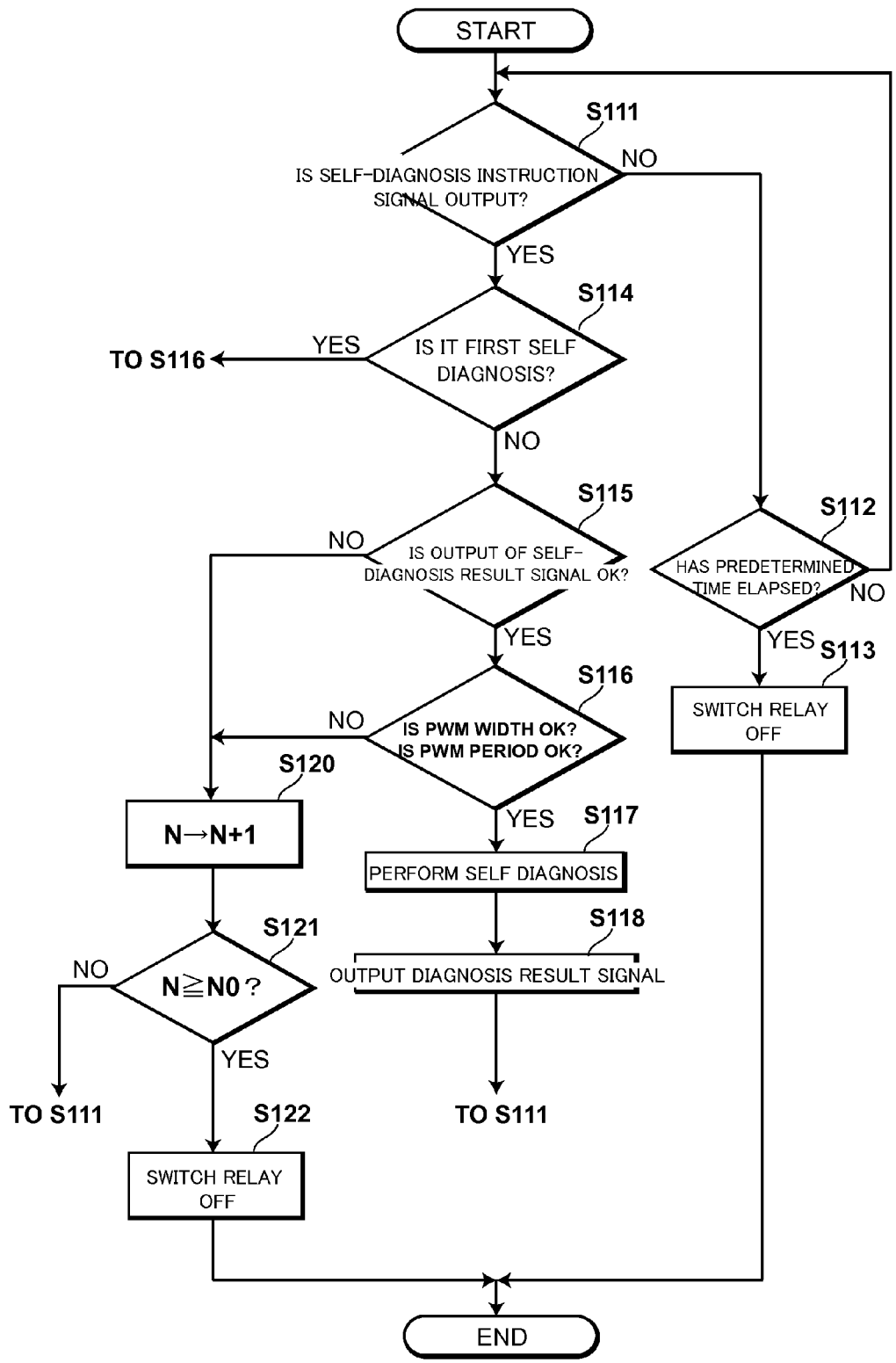
FIG. 5 is a flowchart showing a processing flow performed by a main micom according to a process in which a sub-micom of the vehicle electronic control unit according to the present embodiment monitors and diagnoses operations of the main micom.

Next, a process in which the main micom 2 self-diagnoses and also diagnoses a sub-micom in a case where the sub-micom 3 monitors and diagnoses the main micom 2 is explained also with reference to FIG. 5.

FIG. 5 is a flowchart showing a processing flow performed by a main micom according to a process in which a sub-micom of the vehicle electronic control unit according to the present embodiment monitors and diagnoses operations of the main micom.

As shown in FIG. 5, according to the process in which the sub-micom 3 monitors and diagnoses an operation of the main micom 2, the CPU 2a of the main micom 2 starts the process. At Step S111, the CPU 2a of the main micom 2 detects the output width of the PWM signal SI1 output from the CPU 3a of the sub-micom 3 serving as a self-diagnosis instruction signal. When the CPU 2a determines that the PWM signal SI1 itself is not output, the process proceeds to Step S112. Meanwhile, when the CPU 2a determines that the PWM signal SI1 is output, the process proceeds to Step S114. The CPU 2a detects the PWM signal SI1 to be input to determine whether the self-diagnosis instruction signal is output at a determining step starting from a time T0' shown in E of FIG. 4. In E of FIG. 4, the respective steps subsequent to Step S112 and the respective steps subsequent to Step S114 are performed subsequently to the determining step of Step S111 and typically, shown schematically by a rectangular block started at the time T0' and ends at the time T1 in E of FIG. 4.

In the process of Step S112, when it is determined that the PWM signal SI1 itself serving as a self-diagnosis instruction signal is not output, the CPU 2a of the main micom 2 determines whether a predetermined time (for example, a time point of the time T0' shown in FIG. 4) has elapsed. As a result of determination, when the predetermined time has not elapsed, the CPU 2a returns the process to Step S111. Meanwhile, as a result of determination, when the predetermined time has elapsed, the CPU 2a proceeds the process to Step S113 that follows Step S112.

At Step S113, the CPU 2a of the main micom 2 determines that there is an event, such as a wire connecting the main micom 2 to the sub-micom 3 is broken, and then outputs the relay-drive control signal SI4 at a low level to the AND circuit 4. The AND circuit 4 outputs the low-level relay drive signal SI6 to the relay driving circuit 5 accordingly. The relay driving circuit 5 to which the low-level relay drive signal SI6 is input switches the relay 6 to an off state, so that the supply of electric power from the battery 9 to the motor driving circuit 7 is stopped and driving of the electronic throttle motor M is prohibited. The process of Step S113 is thus completed and this series of processes ends.

At Step S114, when it is determined that the PWM signal SI1 itself serving as a self-diagnosis instruction signal is output, the CPU 2a of the main micom 2 determines whether this process is a first process. As a result of determination, when this process is a first process, the CPU 2a proceeds the process to Step S116. Meanwhile, when this process is not a first process, the CPU 2a proceeds the process to Step S115.

At Step S115, when it is determined that this process is not a first process, the CPU 2a of the main micom 2 determines whether the previous appropriateness-diagnosis result signal SI3 output from the sub-micom 3 is at a high level or a low level. Information related to the voltage level of the previous appropriateness-diagnosis result signal SI3 is stored in the memory of the main micom 2 in the previous process performed before the time T0 in FIG. 4. When the appropriateness-diagnosis result signal SI3 from the sub-micom 3 is at a high level, the CPU 2a determines that the previous self diagnosis result of the main micom 2 is appropriate, and proceeds the process to S116. Meanwhile, when the appropriateness-diagnosis result signal SI3 is a low level, the CPU 2a determines that the previous self diagnosis result is not appropriate and proceeds the process to S120.

At Step S116 when the appropriateness diagnosis result output from the sub-micom 3 is appropriate, the CPU 2a of the main micom 2 determines whether the output width and the output period of the PWM signal SI1 output from the sub-micom 3 serving as a self-diagnosis instruction signal coincide with an output width and an output period set in advance. Specifically, the main micom 2 determines whether the sub-micom 3 stores a predetermined output width and a predetermined output period of a PWM signal to be output to the main micom 2 serving as a self-diagnosis instruction signal in its memory, and the CPU 2a determines whether the output width and the output period of the self-diagnosis instruction signal SI1 actually output from the sub-micom 3 coincide with the predetermined output width and the predetermined output period. As a result of determination, when the output width and the output period of the self-diagnosis instruction signal SI1 output from the sub-micom 3 do not coincide with the predetermined output width and the predetermined output period, the CPU 2a proceeds the process to Step S120. Meanwhile, when the output width and the output period of the self-diagnosis instruction signal SI1 output from the sub-micom 3 coincide with the predetermined output width and the predetermined output period, the CPU 2a proceeds the process to Step S117.

At Step S117 when the output width and the output period of the self-diagnosis instruction signal SI1 output from the sub-micom 3 coincide with the predetermined output width and the predetermined output period, the CPU 2a of the main micom 2 further performs a predetermined calculation corresponding to the PWM signal SI1 input from the CPU 3a of the sub-micom 3 as a self-diagnosis instruction output to perform a self-check (a self diagnosis), and proceeds the process to Step S118 that follows Step S117. As the predetermined calculation in the self-check, a calculation performed by a predetermined calculation formula stored in the memory of the main micom 2 based on the output width of the input PWM signal SI1 is provided.

At Step S118, the CPU 2a of the main micom 2 outputs the self-diagnosis result signal that indicates a result of the self-check to the sub-micom 3 as the PWM signal SI2. As shown in D of FIG. 4, the CPU 2a outputs the PWM signal SI2 as the self diagnosis result signal at the time T1. The CPU 2a then returns the process to Step S111.

In the process of Step S120, when it is determined that the appropriateness-diagnosis result signal SI3 output from the sub-micom 3 is not appropriate and that the output width and the output period of the self-diagnosis instruction signal SI1 output from the sub-micom 3 do not coincide with the predetermined output width and the predetermined output period, the CPU 2a increments the counted value N of a program counter that counts the number that the process of Step 120 is performed by one. The process of Step S120 is thus completed and the CPU 2a proceeds the process to Step S121 that follows Step S120. The program counter is incorporated in the CPU 2a.

In the process of Step S121, the CPU 2a of the main micom 2 determines whether the counted value N of the program counter is equal to or larger than the predetermined value N0. As a result of determination, when the counted value N of the program counter is less than the predetermined value N0, the CPU 2a returns the process to Step S111. Meanwhile, when the counted value N of the program counter is equal to or larger than the predetermined value N0, the CPU 2a proceeds the process to Step S122 that follows Step S121.

At Step S122 when the counted value N of the program counter is equal to or larger than the predetermined value N0, the CPU 2a of the main micom 2 finally determines negatively that a failure is generated in the main micom 2 and outputs the relay-drive control signal SI4 at a low level to the AND circuit 4. The AND circuit 4 outputs the low-level relay drive signal SI6 to the relay driving circuit 5 accordingly. The relay driving circuit 5 to which the low-level relay drive signal SI6 is input switches the relay 6 to an off state, so that the supply of electric power from the battery 9 to the motor driving circuit 7 is stopped and driving of the electronic throttle motor M is prohibited. The process of Step S122 is thus completed and this series of processes ends. When at least one of the relay-drive control signal SI5 at a low level for the AND circuit 4 in the above process in which the sub-micom 3 monitors and diagnoses the main micom 2 and the drive control signal SI4 at a low level for the AND circuit 4 in the process of the main micom 2 is input to the AND circuit 4, the AND circuit 4 outputs the low-level relay drive signal SI6 to the relay driving circuit 5 accordingly and the relay driving circuit 5 to which the low-level relay drive signal SI6 is input switches the relay 6 to an off state, so that the supply of electric power from the battery 9 to the motor driving circuit 7 is stopped and driving of the electronic throttle motor M is prohibited.

According to the configuration of the vehicle electronic control unit of the present embodiment described above, a microcomputer is mainly diagnosed by a PWM signal instead of serial communications, and thus the microcomputer can be diagnosed rapidly and reliably.

In the present invention, the types, arrangements, and numbers of constituent elements are not limited to those described in the above embodiment, and it is needless to mention that changes can be appropriately made without departing from the scope of the invention, such as replacing these constituent elements with other elements having equivalent operational effects.

INDUSTRIAL APPLICABILITY

As explained above, according to the present invention, a microcomputer is mainly diagnosed by a PWM signal instead of serial communications. Therefore, the present invention can provide a vehicle electronic control unit capable of diagnosing a microcomputer rapidly and reliably, and the vehicle electronic control unit is expected to be widely applicable to electronic control units of a vehicle or the like because of its general-purpose and universal characteristics.

The invention claimed is:

1. A vehicle electronic control unit comprising:
    a first microcomputer; and a second microcomputer capable of transmitting and receiving a signal to and from the first microcomputer, the first microcomputer and the second microcomputer performing a monitoring process, wherein
        one of the first microcomputer and the second microcomputer outputs a pulse width modulated (PWM) signal, indicating a voltage at a high level or a low level, to the other microcomputer,
        the one microcomputer supports a process of the other microcomputer,
        the other microcomputer controls operations of the entire vehicle electronic control unit,
        the other microcomputer detects a high-time during which the voltage of the PWM signal is at the high level and which is an output width of the PWM signal, performs a self diagnosis with an output width obtained by a calculation using a predetermined calculation formula stored in a memory of the other microcomputer based on the output width of the PWM signal output from the one microcomputer, and outputs a result of the self diagnosis to the one microcomputer, and
        the one microcomputer diagnoses the other microcomputer based on the result of the self diagnosis.

2. The vehicle electronic control unit according to claim 1, wherein the other microcomputer diagnoses the one microcomputer based on at least one of the output width and a period of the PWM signal output from the one microcomputer.

3. The vehicle electronic control unit according to claim 1, wherein the one microcomputer diagnoses the other microcomputer based on at least one of a high-time, during which the voltage of the PWM signal indicating the result of the self diagnosis is at the high level and which is an output width, and a period of the PWM signal indicating the result of the self diagnosis.

4. The vehicle electronic control unit according to claim 1, wherein the other microcomputer outputs the result of the self diagnosis to the one microcomputer also through serial communications.

5. The vehicle electronic control unit according to claim 1, wherein the other microcomputer further diagnoses the one microcomputer and prohibits an operation of a target to be controlled by the vehicle electronic control unit when one of a diagnosis of the other microcomputer by the one microcomputer and a diagnosis of the one microcomputer by the other microcomputer is negative.

6. The vehicle electronic control unit according to claim 1,
    wherein when the monitoring process is performed at a first time and the result of the self diagnosis is not previously stored in the memory of the other microcomputer, the other microcomputer determines whether at least one of the output width and the period of the PWM signal output from the one microcomputer correspondingly coincide with a predetermined output width and a predetermined period, and
    wherein when the monitoring process is performed not at the first time and the result of the self diagnosis is previously stored in the memory of the other microcomputer, the other microcomputer determines whether the stored result of the self diagnosis is appropriate, and if the stored result of the self diagnosis is determined as appropriate, the other microcomputer determines whether at least one of the output width and the period of the PWM signal output from the one microcomputer correspondingly coincide with the predetermined output width and the predetermined period.

* * * * *